United States Patent [19]
Case

[11] Patent Number: 4,477,906
[45] Date of Patent: Oct. 16, 1984

[54] METHOD AND APPARATUS FOR POPULATION INVERSION

[75] Inventor: William E. Case, Arlington, Tex.

[73] Assignee: LTV Aerospace and Defense Company, Dallas, Tex.

[21] Appl. No.: 370,174

[22] Filed: Apr. 20, 1982

[51] Int. Cl.$^3$ .................... H01S 3/091; H01S 3/16
[52] U.S. Cl. .................... 372/41; 372/70; 372/91
[58] Field of Search ............ 372/39, 41, 91, 4, 69, 372/70

[56] References Cited

U.S. PATENT DOCUMENTS

| | | | |
|---|---|---|---|
| 3,258,716 | 6/1966 | Nassau et al. | 372/41 |
| 3,591,517 | 7/1971 | Van Der Ziel et al. | 372/41 |
| 3,786,365 | 1/1974 | Robinson et al. | 372/41 |
| 4,054,852 | 10/1977 | Nicolai | 372/41 |
| 4,167,712 | 9/1979 | Esterowitz et al. | 372/41 |
| 4,233,570 | 11/1980 | Emmett et al. | 372/41 |

OTHER PUBLICATIONS

Case et al., "Sensitivity of CW and Pulsed Laser--Pumped Pr Infrared Quantum Counters", J. Appl. Phys. 50(7), Jul., pp. 4509–4515.

*Primary Examiner*—James W. Davie
*Attorney, Agent, or Firm*—James M. Cate; S. S. Sadacca

[57] ABSTRACT

Stimulated emission at the approximate wave length of 4.5 microns, 2.25 microns and 1.6 microns is obtained from pumping on an excited energy level. The phenomenon of photon avalanching is utilized to create a population inversion within three lower level states that have a substantially equal energy spacing to provide resonance between neighboring ions. This resonance feeds the photon avalanching process when pump having sufficient power in excess of the critical pump power irradiates a $LaCl_3:Pr^{+3}$ crystal at an excited energy level to maintain a population inversion in an optical cavity.

63 Claims, 6 Drawing Figures

METHOD AND APPARATUS FOR POPULATION INVERSION

The U.S. Government has rights in this invention under Contract N00014-81-C-2631.

TECHNICAL FIELD

The present invention pertains generally to population inversion in an active laser medium and more particularly to population inversion that results from pumping on an excited energy level.

BACKGROUND OF THE INVENTION

For an active laser medium to have gain, the medium must make use of an inverted population in the levels which are to interact with the signal frequency. Actually, when the term inverted is used, it does not imply that thermal populations are reversed, although that is the situation in some cases. Rather, it is intended to indicate that the upper state population is greater than the lower. Broadly speaking, there are different inversion systems which are of importance in solid state lasers.

One method of population inversion applicable to nonsemiconducting solids involves the use of three energy levels. The function of the third and highest level is solely in the inversion process. The only requirement insofar as the levels are concerned is that their retransition probabilities, that is the probability that an ion will make a transition from one state to another, for both the signal and the pump power, and their relaxation time, that is the time required for an ion to go from a high energy state to a lower energy state, be appropriate.

The active lasing medium of a solid state optically pumped laser is normally a polished crystalline or glass material which acts as host for a suitable amount (typically 0.1 mole percent) of an activator impurity element, such as ions of chromium or neodymium. When incoherent optical-pumping radiation is applied to the laser, these activator ions are excited from their ground state to higher energy states. The excited ions quickly undergo nonradiative transitions to a metastable state, from which they decay relatively slowly by radiative transitions to the terminal state, which may be an intermediate level. This fluorescent transition provides the photons for the laser. The means of decay from the terminal state to the ground state, which is the lowest state, is not important, but it should be sufficiently rapid to keep the terminal state depopulated. When the terminal state is not the same as the ground state, this is termed a four level optically pumped laser which is a more general type. Some very important lasers, for example, ruby, are three level devices, and in that case the terminal level is coincident with the ground level.

In four level lasers, population inversion is immediately achieved and optical gain is realized as soon as sufficient ions are pumped into the metastable state to overcome the optical circuit losses. In three level lasers, at least half of the ions must be pumped from the ground state into the metastable state before population inversion and gain can be realized. Thus, four level lasers require much less optical-pumping power to achieve lasing and have higher conversion efficiencies under moderate pumping levels. For these reasons, four level lasers offer a practical means of realizing CW operation in solid-state lasers.

Most activator ions in solid state optically-pumped lasers belong to the rare earth group of elements, the reason being that the electronic charge clouds of rare-earth ions are quite small. Thus, there is little overlap of the electron cloud with the adjacent host lattice ions and, consequently, little broadening of the spectral transitions. A narrow spectral width for the fundamental emission line is necessary since the pump power required to achieve lasing threshold is proportional to this line width.

The crystalline or glass laser material is usually fabricated in a rod configuration with highly reflecting surfaces forming a Fabry-Perot resonator. In early solid state lasers, the rod ends were ground accurately flat and parallel and coated with a multi-layer dielectric material or a thin layer of metal to obtain a reflectivity close to one. Since that time many different end conditions have been in common use, such as one flat end and one total internal reflecting end or both ends spherical. The threshold conditions for establishing laser oscillation in any optical resonator is reached when the gain of the optical traveling wave passing through the amplifying medium (excited activator ion) just balances the losses associated with the resonator.

In an optical cavity, which is large in all dimensions compared with the optical wavelength, many resonant modes can exist, just as for a large microwave resonator. Lasing (positive feedback) can build up only in these discreet modes, and the gain available in any particular mode is a function of how close its resonant frequency is to the center frequency of the active-ion fluorescent line. The losses in a particular mode depend on the configuration of reflectors that make up the optical cavity. The rate of stimulated emission must be related to a single mode and is equal to the spontaneous emission into a single mode times the number of photons in the mode (radiation energy density per mode). In choosing an active laser medium, the major concerns are the specific application and the desired frequency or wavelength.

Regarding the application, the need for the technology is driven by the system application. For example, the Navy is concerned with secure communications ship to shore, ship to plane and ship to ship. If a laser is utilized in the communication link, it is desirable to have good transmissivity properties through the atmosphere. The disadvantage in choosing an active medium for a particular application arises in that only certain windows, that is spectral windows, are available for satisfactory transmission. This is due to the fact that certain molecular species exist in the atmosphere that absorb the laser scatter. For example, carbon dioxide and carbon monoxide in the atmosphere exhibit a fairly heavy absorption in the three to five micron band. However, there is a small window that exists around 4.5 microns that allows adequate transmission. Transmission at other wavelengths would require the use of much higher powered transmitters to overcome the atmospheric absorption.

Even though a window may exist where communication is desirable, an active laser medium must be available with a spectral emission line at the proper wavelength. To realize a particular wavelength is somewhat of a hit and miss technique in that the available active laser mediums must be examined to see if one has adequate properties and sufficient gain at a given wavelength for utilization in an optical cavity to provide a laser.

In view of the above problems, there exists a need to further develop new pumping techniques in conjunction with various rare earth ions to determine if they will produce sufficient gain in an optical cavity. These new frequencies will expand the range of available wavelengths for laser communication.

SUMMARY OF THE INVENTION

The present invention disclosed and claimed herein comprises a method for population inversion. A plurality of rare earth ions are supported in a matrix configuration, each ion having at least four energy levels, three of which are incrementally spaced with an equal energy spacing. Electrons are pumped from one of the intermediate energy levels to the highest energy level to obtain a population inversion in the intermediate levels such that decay from the highest intermediate level to the next lower intermediate level provides emission of photons. In addition, the decay induces population of the intermediate levels in neighboring ions from the lower levels.

In another aspect of the present invention, the four levels are a ground state, a first intermediate excited energy level, a second and higher intermediate excited energy level and a third and higher excited energy level. The electrons are pumped from the excited energy level to the highest excited energy level and decay to one of the intermediate levels.

In yet another aspect of the present invention, the photons emitted from the matrix configuration are fully reflected at one end thereof and partially reflected at the other end thereof such that an optical resonant cavity is formed at the fundamental wavelength thereof. The optical cavity in conjunction with the population inversion results in the emission of a coherent light beam.

DETAILED DESCRIPTION OF THE DRAWINGS

For a more complete understanding of the present invention and the advantages thereof, reference is now made to the following description taken in conjunction with the accompanying drawings in which:

FIG. 2b is a partial energy diagram of a different resonance for the ions in FIG. 2a;

DETAILED DESCRIPTION OF THE INVENTION

The present invention utilizes as the host crystal either lanthium trichloride ($LaCl_3$) or lanthium tribromide ($LaBr_3$) which is doped with a small percentage of trivalent rare earth ions praseodymium ($Pr^{+3}$) or samarium ($Sm^{+3}$). The rare earth trihalides have traditionally been chosen for use as infrared quantum counter (IRQC) materials. In each crystal, the electronic transitions are within the 4F subshell and are not strongly affected by the host crystal. The host crystal is essentially a supporting structure that distributes the trivalent rare earth ions in a matrix configuration. The trivalent rare earth ions themselves have a plurality of distinct energy levels, the separation of each of these levels corresponding to a discrete frequency that is a function of the energy spacing between the various levels. For example, a separation between two energy levels $E_1$ and $E_2$ corresponds to photon wave energy having a frequency $\nu_{12}$ given by Bohr's equation:

$$\nu_{12} = (E_2 - E_1)/h$$

where h is Planck's constant. Within the host crystal, the energy levels in the trivalent rare earth ions are quite sharp and so it is relatively easy to utilize narrow band laser pumping for the visible transition, that is, a transition between two energy levels that have an energy difference that corresponds to the frequency of the laser pump.

Figure 1:
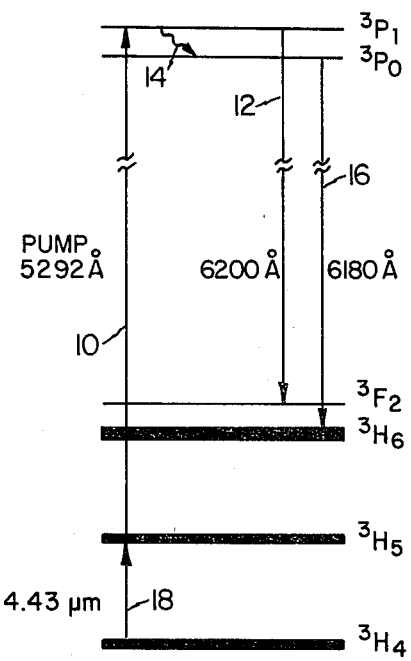
FIG. 1 is a partial energy level diagram of a praseodymium ion.

Referring now to FIG. 1, there is shown an energy level diagram for an $LaCl_3$ crystal doped with $Pr^{+3}$ ions which form a complex $Pr^{+3}:LaCl_3$. FIG. 1 is a partial energy level diagram showing only the energy levels that are relevant to the present invention. It should be understood that there are other energy levels that are not utilized within the Pr ions. The lowest energy level is labeled $^3H_4$. A second energy level $^3H_5$ and a third energy level $^3H_6$ are also shown. It should be understood that the spacing between the levels $^3H_5$ and $^3H_4$ and spacing between the levels $^3H_6$ and $^3H_5$ are essentially identical, therefore the energy is also identical. At a higher energy level there are two closely spaced levels, $^3P_0$ and $^3P_1$. An additional lower level, $^3F_2$, is spaced slightly higher than the $^3H_6$ level.

The $^3H_4$ level is the lowest level which is hereinafter referred to as the ground state. The ground state of an ion is the state in which the electrons in an ion have the highest probability of populating under normal conditions. Although there is some probability for electrons to populate the upper level states, normal probabilities favor the ground state for the highest population density.

In order to increase the population density of the upper level, it is necessary to apply an external stimulus to raise the electron to a higher energy level. For example, the energy spacing between the $^3H_5$ and the $^3H_4$ corresponds to a wavelength of 4.43 microns. Illumination of a $Pr^{+3}$ ion with 4.43 micron radiation causes the population density of the $^3H_5$ level to increase. However, the $^3H_5$ level is an excited state and decays back to the ground state $^3H_4$. This decay can proceed by two processes. It can either decay by emitting photons at a frequency of 4.43 microns or it can decay by transferring its energy to the host crystal lattice. This transferring of energy to the lattice is termed a phonon decay. A phonon is a quantized particle defining the vibrational energy state of a lattice, just as a photon is related to an electromagnetic wave. Hereinafter, the levels above the $^3H_4$ ground state will be referred to as excitation levels.

Multi-phonon decays due to small energy gaps are likely to dominate the decay process for the low lying energy levels and to determine life times and population densities. For a given gap, the rate at which multi-phonon decays occurs is largely determined by the host crystal lattice. Crystal lattices which will support high energy phonons are generally referred to as "hard", while those which do not are "soft". The rare earth trihalides are very soft crystals. For example, the phonon cut-off for $LaCl_3$ is at 260 $cm^{-1}$, while that for LaBr$_3$ is about 175 cm$^{-1}$. As the number of phonons needed to span the gap increases, the likelihood that an ion will decay by a phonon emission decreases sharply.

Referring further to FIG. 1, an external pumping frequency is represented by the solid arrow 10 and has a wavelength of 5292Å. When this pump frequency is applied to the Pr$^{+3}$ ion with a sufficient power level, electrons that populate the $^3$H$_5$ metastable level absorb the energy and are raised to the $^3$P$_1$ excitation level. Once the electrons are in the $^3$P$_1$ state, they only occupy this state for a certain period of time which is termed the relaxation time. The electrons undergo either phonon decay or photon decay, that is, emission of photons by fluorescence. The electrons can also decay to the $^3$F$_2$ excitation level by the path represented by the solid arrow 12 which represents fluorescence at a wavelength of 6200Å.

The electron can also undergo phonon decay from the $^3$P$_1$ level to the $^3$P$_0$ level which is represented in FIG. 1 by the wavy arrow 14. The $^3$P$_0$ level is therefore populated from the $^3$P$_1$ level. Electrons then populating the $^3$P$_0$ level decay to the $^3$H$_6$ level by photon emission as represented by the solid arrow 16. The wavelength of the fluorescence for the transition from the $^3$P$_0$ level to the $^3$H$_6$ level is 6180Å. The population in both the $^3$F$_2$ and the $^3$H$_6$ levels have therefore been increased by applying the pumping frequency to the $^3$H$_5$ level. Since these levels are excited states they decay to the $^3$H$_4$ ground state. The decay process will be further described below. It should be understood, however, that for the pump frequency to populate the $^3$P$_1$ level from the $^3$H$_5$ level, the $^3$H$_5$ level must first be populated by raising electrons from the $^3$H$_4$ ground state to the $^3$H$_5$ level. Under normal conditions, there is a very low probability of population within the $^3$H$_5$ level. Therefore, it requires an external pumping frequency of 4.43 microns, as represented by the solid arrow 18, to raise the electrons in the $^3$H$_4$ ground state to the $^3$H$_5$ level. This results in a double pumping system to raise electrons from the $^3$H$_4$ ground state to the $^3$P$_1$ level.

In recent years, a phenomenon known as "photon avalanching" has been discovered. This phenomenon is discussed in "The Photon Avalanche: A New Phenomenon in Pr$^{3+}$—Based Infrared Quantum Counters", *Applied Physics Letters* 35(2), (15), July 9, 1979). The large photon avalanche phenomenon basically is an unexpected large population of upper excitation levels in an ion from a normally unpopulated intermediate level. The process depends on energy transfer between neighboring ions. Onset of the phenomenon occurs at a magnitude of pump power that exceeds a "critical pump" value. Power in excess of the critical pump value results in a multiplication of excitations. The present invention utilizes photon avalanching to populate the intermediate levels $^3$H$_5$ and $^3$H$_6$.

Figure 2A:
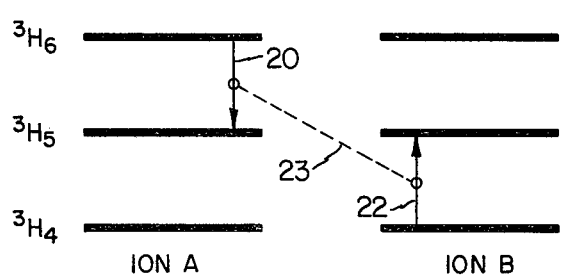
FIG. 2a is a partial energy diagram of the lower levels of two neighboring ions in resonance.
Figure 2B:
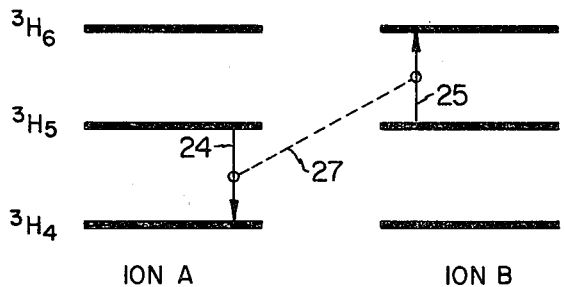

Referring now to FIGS. 2a and 2b, there is shown energy level diagrams for two neighboring praseodynium ions illustrating only the $^3$H$_4$ state, the $^3$H$_5$ excitation level and the $^3$H$_6$ excitation level. The two ions are labeled ion A and ion B for both FIG. 2a and 2b.

In FIG. 2a, ion A illustrates a transition of electrons from the $^3$H$_6$ level to the $^3$H$_5$ level as represented by a solid arrow 20. One result of the transition is the creation of phonons in the crystal lattice; another possibility (but less probable) is the creation of a photon at a wavelength of 4.43 micrometers which is the energy level spacing of the excitation levels $^3$H$_6$ and $^3$H$_5$. Finally, the possibility exists strongly that all of the energy from this transition is transferred or coupled to the $^3$H$_4$ ground state of ion B as represented by a dotted line 23. This energy, since it is at a wavelength of 4.43 microns, raises electrons normally residing in the $^3$H$_4$ ground state of ion B to the $^3$H$_5$ level of ion B as represented by a solid arrow 22. The net result is a stimulated population of the $^3$H$_5$ level of ions A and B.

In FIG. 2b, there is illustrated a transition of electrons from the $^3$H$_5$ level of ion A to the $^3$H$_4$ ground state thereof which is represented by a solid arrow 24. Again, this transition may create either phonons or photons at a wavelength of 4.43 micrometers due to the energy spacing between the levels. As was the case with the ion pair in FIG. 2a, the possibility also exists that the transition energy is coupled to ion B as represented by a dotted line 27 to raise electrons that are in the $^3$H$_5$ level of ion B to the $^3$H$_6$ level thereof as represented by a solid arrow 25. This proposed resonance condition results in a population of the $^3$H$_6$ and the $^3$H$_5$ excitation levels of the Pr$^{+3}$ ions as a result of decay from the $^3$P$_0$ level, as shown in FIG. 1.

Although the $^3$H$_5$ level is an excited state which has a low population density, factors such as noise and external stimuli result in some population therein. With photon avalanching, a pump frequency that is resonant between the $^3$H$_5$ and the $^3$P$_1$ excitation levels is sufficient to populate the $^3$H$_6$ by a multiplication of electrons, thereby initiating the resonance between neighboring ions to further populate the $^3$H$_5$ level that feeds the photon avalanche process.

To utilize the LaCl$_3$:Pr$^{+3}$ medium in a laser, there must first be a population inversion to provide gain. This requires that the $^3$H$_6$ level have a higher population density than the $^3$H$_5$ level and the $^3$H$_5$ level have a higher population density than the $^3$H$_4$ ground state. For this to occur, it is necessary that the electrons are pumped from the $^3$H$_5$ level to the $^3$P$_1$ level and consequently to the $^3$H$_6$ level at a faster rate than they relax to the $^3$H$_4$ ground state.

Figure 3:
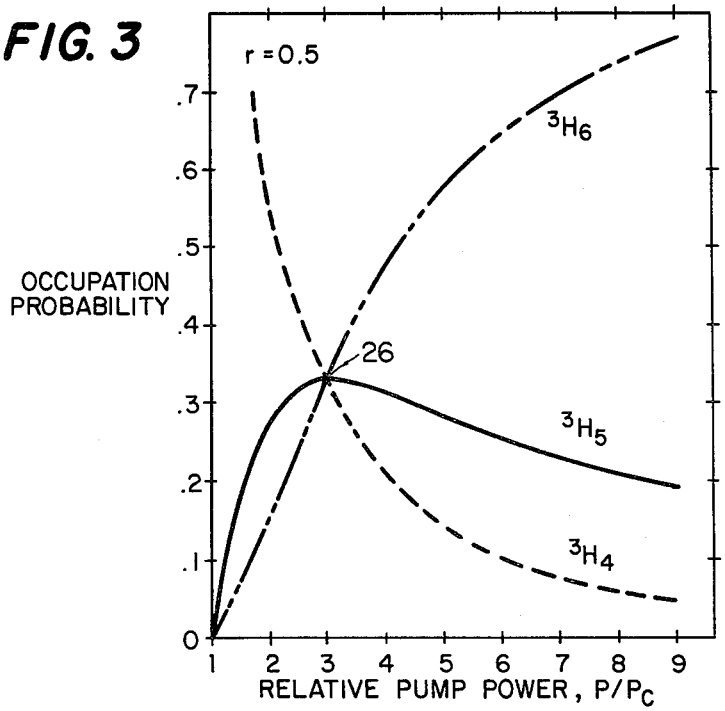
FIG. 3 is a plot of the occupational probabilities of the lower levels as a function of pump power.

FIG. 3 illustrates a plot of the occupational probabilities for the $^3$H$_4$ ground state, the $^3$H$_5$ excitation level and the $^3$H$_6$ excitation level versus the relative pump power P/P$_c$ where P is the power of the pumping frequency and P$_c$ is the critical pump power to begin the photon avalanche phenomenon. At a P/P$_c$ of 1, or at the critical pump rate, the population density in the $^3$H$_4$ ground state is very high compared to the population density in both the $^3$H$_5$ and the $^3$H$_6$ levels. As the pump power is increased, the population density in the $^3$H$_5$ and $^3$H$_6$ levels increases while the population density in the $^3$H$_4$ ground state is depleted to feed the photon avalanche process. At a P/P$_c$ of 2, the occupational probability for the $^3$H$_6$ level is lower than the occupational probability for the $^3$H$_5$ level and in a similar manner both the $^3$H$_6$ and $^3$H$_5$ levels have a lower occupational probability than the $^3$H$_4$ ground state. This illustrates that, although the photon avalanche process is present, there is no population inversion. At a P/P$_c$ of 3, the occupational probabilities of the $^3$H$_4$ ground state and the $^3$H$_5$ and $^3$H$_6$ are equal as noted by the crossover point 26. As the pump power P increases, it can be seen that the $^3$H$_4$ ground state now has a lower occupational probability than the $^3$H$_5$ level which is also lower than the $^3$H$_6$ level. When this condition is present, there is a population inversion or, the upper levels have a higher population density than the lower levels. In this condition the medium can be considered to have gain and therefor is a strong candidate for a laser.

Figure 4:
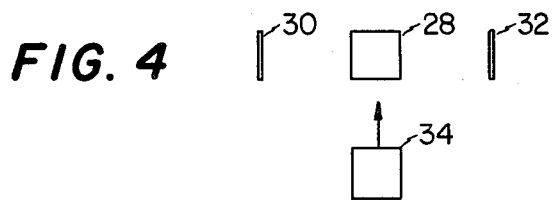
FIG. 4 is a schematic block diagram of a laser utilizing the active medium of the present invention.

Referring to FIG. 4, there is shown a schematic representation of a laser utilizing the $LaCl_3:Pr^{+3}$ as the active medium. An $LaCl_3:Pr^{+3}$ crystal 28 is disposed between a highly reflecting mirror 30 and a partially reflecting mirror 32. The crystal 28 provides the active medium and the mirrors 30 and 32 form an optical cavity. The distance between the mirrors 30 and 32 is adjusted to tune the cavity to a particular multiple of wavelengths. This provides an optical cavity that is resonant at particular frequency-the fundamental frequency.

The crystal 28 is illuminated by an external pump 34 that is comprised of a tuneable dye laser that outputs a narrow band optical signal. The power output of the pump 34 is sufficient to uniformly illuminate the crystal 28 such that sufficient energy is transmitted to the $Pr^{+3}$ ions in the lattice structure to optically pump the electrons from the $^3H_5$ level to the $^3P_1$ level to begin the photon avalanche process, as described above with reference to FIG. 1.

Figure 5:
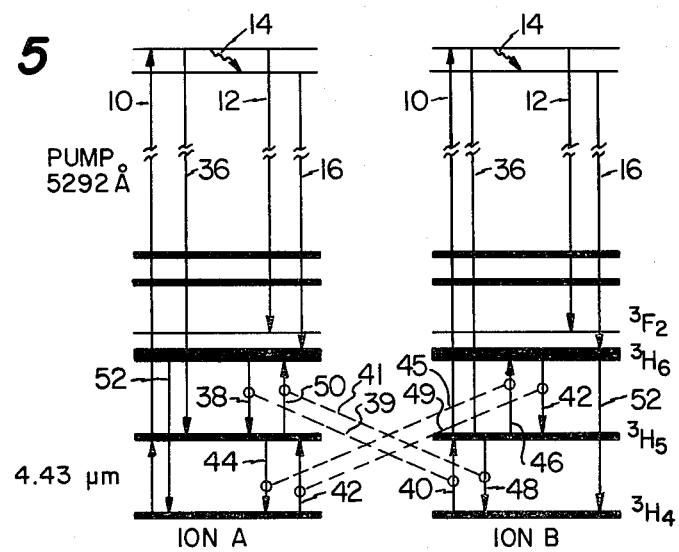
FIG. 5 is a partial energy diagram of two neighboring ions in a laser cavity.

Referring to FIG. 5, there is shown a partial energy level diagram for two neighboring $Pr^{+3}$ ions in the active medium of the laser of FIG. 4 wherein like numerals refer to like parts in the various figures. The pump frequency is at 5292Å and is referenced by the solid arrow 10 in both ion A and ion B. As described above with reference to FIG. 1, the electrons excited to the $^3P_1$ level relax to the $^3P_0$ level by a multiphonon relaxation as referenced by the wavy arrow 14. In addition to relaxation by the multiphonon decay, ions in the $^3P_1$ level can relax by photon emission to the $^3H_5$ level which can further stimulate electrons in the $^3H_5$ level to the $^3P_1$ level. However, the majority of the electrons in the $^3P_1$ level are not excited through this mode of stimulation.

As the electrons decay from the $^3P_0$ level to the $^3H_6$ level by the transition path referenced by the solid arrow 16, they populate the $^3H_6$ level. As described above with reference to FIG. 1, this population of the $^3H_6$ level in conjunction with a power level for the pump frequency in excess of the critical pump power begins the photon avalanche process.

Ion A has a downward transition 38 from the $^3H_6$ level to the $^3H_5$ level which is coupled to the $^3H_4$ ground state of Ion B as represented by a dotted line 39. This generates an upward transition 40 of electrons in Ion B from the $^3H_4$ ground state to the $^3H_5$ level. In effect, one electron making the transition from the $^3H_6$ level to the $^3H_5$ level in ion A has increased the overall population of the $^3H_5$ level in the $LaCl_3:Pr^{+3}$ active medium by two electrons. In a similar manner, a downward transition 42 from the $^3H_6$ level to the $^3H_5$ level of ion B is coupled to Ion A, as represented by a dotted line 41, and stimulates an upward transition 42 from the $^3H_4$ ground state to the $^3H_5$ level in ion A. In addition, a downward transition 44 from the $^3H_5$ level to the $^3H_4$ ground state of ion A is coupled to Ion B, as represented by a dotted line 45, and stimulates an upward transition 46 from the $^3H_5$ level to the $^3H_6$ level in ion B. Similarly, a downward transition 48 from the $^3H_5$ level to the $^3H_4$ ground state of ion B is coupled to ion A, as represented by a dotted line, 49, and stimulates an upward transition 50 from the $^3H_5$ level to the $^3H_6$ level of ion A.

For each transition from the $^3H_6$ level to the $^3H_5$ level and from the $^3H_5$ level to the $^3H_4$ ground state, photons are emitted in the 4.3 to 4.6 micron wavelength region. This range of wavelengths is due to the fact that in each of the above described levels, there is a manifold of discreet energy levels within the main energy level. The frequency of the photons emitted is a function of the energy difference between the level at which the electron originates and the energy level at which the electron terminates.

In addition to the $^3H_6$ to $^3H_5$ transitions and the $^3H_5$ to $^3H_4$ transitions, there can be a transition 52 from the $^3H_6$ level to the $^3H_4$ level in both ion A and ion B. This results in a photon emission at a wavelength of from 2.2 to 2.3 micrometers. In addition, there is also the possibility for a lasing transition from the $^3F_2$ level to the $^3H_4$ level which results in a photon emission at 1.6 microns. It should be understood that the resonance of the $^3H_6$, $^3H_5$ and $^3H_4$ levels in ion A and ion B in conjunction with the pump power is responsible for the population inversion of the $LaCl_3:Pr^{+3}$ crystal. When this crystal is placed in an optical cavity, which is tuned to one of the above described lasing transitions, stimulated emission occurs. It is important that the gain of the crystal 28 is sufficient to overcome any optical losses within the optical cavity formed by the mirrors 30 and 32.

When the gain of the crystal 28 that is pumped by the pump 34 is sufficient to overcome optical losses, stimulated emission occurs and the laser lases. What occurs is that for a downward transition of, for example, an electron from the $^3H_6$ level to the $^3H_5$ level, an emission of photons at approximately 4.5 microns is emitted. The photons are reflected from the highly reflective mirror 30 back through the crystal 28 to the partially reflecting mirror 32. In passing through the crystal 28, the frequency of the photon is tuned to the spacing between the $^3H_6$ and $^3H_5$ levels or the $^3H_5$ and $^3H_4$ levels such that they stimulate a transition upward to further populate the upper levels, thus maintaining gain in the crystal 28. As long as there are sufficient electrons in the upper levels and population inversion is maintained, photons will continue to be emitted at the fundamental frequency of the optical cavity.

In summary, a method has been described for optically pumping an active laser medium from an intermediate excitation level without directly pumping the ground state of the active medium. This provides a method for further increasing the frequency range and the available selection of active laser mediums. The method of population inversion requires that there be a minimum of three lower levels having a substantially equi-distance spacing such that they resonate between the neighboring ions in the active laser medium. The intermediate of these three levels is pumped to raise the electrons to a higher excitation level such that they decay to the upper of the three resonant levels. This invention has utilized the phenomenon of photon avalanching to realize population inversion in an active laser medium.

Although the preferred embodiment of the invention has been described in detail, it should be understood that various changes, substitutions and alterations can be made therein without departing from the spirit and scope of the invention as defined by the appended claims.

I claim:
1. A method for population inversion comprising:
supporting a plurality of electrons in a bounded volume, each of the electrons located at a site and having at least four energy levels, the energy levels including a ground level and first and second excited state levels, with substantially equal energy spacing between the ground level and the first excited state level and between the first and second excited state levels, and having energy transfer effected between electrons on neighboring sites; and pumping the electrons from one of the excited state energy levels on a first site to the highest energy level at the first site, such that subsequent decay of the excitation provides emission of photons and such that energy transferred between the first site and a second site induces a population of the excited state levels at the first and second sites.

2. The method of claim 1 wherein the step of supporting comprises:
supporting the plurality of electrons on ions in a matrix configuration.

3. The method of claim 2 wherein the step of supporting comprises supporting a plurality of electrons on trivalent rare earth ions in a matrix configuration.

4. The method of claim 3 wherein the step of supporting comprises supporting a plurality of electrons on trivalent rare earth ions in a crystal lattice of rare earth trihalides such that the ions are in a matrix configuration.

5. The method of claim 2 wherein the step of pumping comprises optically pumping the electrons from one of the intermediate energy levels to the highest energy level.

6. The method of claim 5 wherein the step of optically pumping comprises directing a laser at the matrix configuration of electrons to pump the ions from one of the intermediate energy levels to the highest energy level.

7. A method for population inversion comprising:
supporting at first and second sites a plurality of electrons on rare earth ions in a matrix configuration, each of the electrons at the first and second sites having a ground state, a first excitation energy level, a second and higher excitation energy level and a third excitation energy level higher than the first and second energy levels, the energy spacing between the ground state and the first energy level being substantially equal to the energy spacing between the first and second energy levels and the electrons having energy transfer effected between electrons on neighboring sites; and pumping the electrons from the first excitation level at the first site to the third excitation level at the first site such that subsequent relaxation of electrons from the second excitation level to the first excitation level provides emission of photons and such that energy transfer between the first site and the second site induces a population of the excited state levels at the first and second sites.

8. The method of claim 7 wherein the step of supporting comprises supporting a plurality of electrons on trivalent rare earth ions in a matrix configuration.

9. The method of claim 8 wherein the step of supporting comprises supporting the electrons on ions in a crystal lattice of rare earth trihalides.

10. The method of claim 7 wherein the step of pumping comprises optically pumping the electrons from one of the first and second excitation energy levels to the third excitation level.

11. The method of claim 10 wherein the step of optically pumping comprises directing a laser at the rare earth electrons to pump the ions from one of the first and second excitation energy levels to the third excitation level.

12. The method of claim 7 wherein the step of supporting comprises the step of supporting electrons on a plurality of praseodymium ions in a matrix configuration.

13. The method of claim 12 wherein the step of supporting comprises supporting the electrons in a crystal lattice structure of lanthium trichloride.

14. The method of claim 13 wherein the step of supporting comprises supporting a plurality of electrons on trivalent samarium ions in the crystal lattice structure.

15. A method for lasing comprising:
supporting a plurality of electrons on rare earth ions in a matrix configuration, each of the electrons having at least four energy levels, three of which are incrementally spaced with a substantially equal energy spacing;

pumping the electrons from one of the intermediate incrementally spaced levels to the highest level to obtain population inversion in the incrementally spaced energy levels such that decay from the highest of the incrementally spaced levels to the adjacent lower level provides emission of photons and induces population of the intermediate levels of neighboring electrons from the lowest level thereof; and sustaining an oscillatory mode within the matrix configuration such that coherent light is emitted at a fundamental wavelength.

16. The method of claim 15 wherein the step of supporting comprises supporting a plurality of electrons on trivalent rare earth ions in a matrix configuration.

17. The method of claim 16 wherein the step of supporting comprises supporting the electrons in a crystal lattice structure of rare earth trihalides.

18. The method of claim 15 wherein the step of supporting comprises supporting a plurality of electrons on trivalent rare earth ions in a matrix configuration, each of the ions having a ground state, two intermediate energy levels, the ground state and the two intermediate energy levels incrementally spaced with a substantially equal energy spacing and a higher energy level.

19. The method of claim 15 wherein the step of pumping comprises optically pumping the electrons from one of the incrementally spaced energy levels to the highest energy level.

20. The method of claim 19 wherein the step of optically pumping comprises directing a laser at the electrons to pump the electrons from one of the incrementally spaced energy levels to the highest energy level.

21. The method of claim 15 wherein the step of sustaining an oscillatory mode comprises:
reflecting emitted photons from one end of the matrix configuration; and
partially reflecting emitted photons from the diametrically opposite other end of the matrix configuration such that an optically resonant cavity is formed.

22. A method for lasing comprising:
supporting a plurality of electrons on rare earth ions in a matrix configuration, each of the electrons having a ground state, a first intermediate energy level, a second and higher intermediate energy level and a third excitation level higher than the first and second intermediate levels, the ground state, the first intermediate energy level and the second intermediate level incrementally spaced with a substantially equal energy spacing;

pumping the electrons in the first intermediate energy level to the third excitation level to provide a population inversion such that relaxation of electrons from the second intermediate energy level to the first and second intermediate energy level results in photon emission and further induces population of the intermediate levels of neighboring electrons from the ground state thereof;

reflecting emitted photons from one end of the matrix configuration; and partially reflecting emitted photons from the diametrically opposite end of the matrix configuration such that an optically resonant cavity is formed with the inverted population of the ions providing gain therein.

23. The method of claim 22 wherein the step of supporting comprises supporting a plurality of electrons on trivalent rare earth ions in a matrix configuration.

24. The method of claim 23 wherein the step of supporting comprises supporting the electrons in a crystal lattice structure of rare earth trihalides.

25. The method of claim 22 wherein the step of pumping comprises optically pumping the electrons from the first intermediate energy level to the third excitation level.

26. The method of claim 25 wherein the step of optically pumping comprises directing a laser at the rare earth ions.

27. The method of claim 22 wherein the step of supporting comprises supporting a plurality of electrons of trivalent praseodymium ions in a crystal lattice structure of lanthium trichloride.

28. The method of claim 22 wherein the step of supporting comprises supporting a plurality of electrons on trivalent samarium ions in a matrix configuration.

29. A method for lasing comprising:

supporting a plurality of electrons on trivalent rare earth ions in the crystal lattice structure of lanthium trichloride, each of the electrons having a ground state, a first intermediate energy level, a second and higher intermediate energy level and a third excitation level higher than the first and second intermediate levels, the ground state, the first intermediate energy level and the second intermediate energy level are incrementally spaced with substantially equal energy spacings;

directing a laser at the electrons to pump the electrons from the first intermediate energy level to the third intermediate excitation level to provide a population inversion in the second intermediate energy level such that relaxation of electrons from the second intermediate energy level to the first intermediate energy level results in photon emission and further induces population of the first and second intermediate energy levels of neighboring ions from the ground state thereof;

reflecting emitted photons from one end of the crystal lattice structure; and partially reflecting light from the diametrically opposite other end of the crystal lattice structure such that an optically resonant cavity is formed and coherent light is emitted at the fundamental wavelength of the resonant cavity.

30. An apparatus for population inversion comprising:

means for supporting a plurality of electrons in a bounded volume, each of the electrons being supported at a site and having at least four energy levels, including a ground level and first and second excited state levels, the energy levels having substantially equal energy spacing between the ground level and the first excited state level and the first and second excited state levels, the electrons further having energy transfer effected between the electrons on neighboring sites; and means for pumping the electrons from one of the excited state energy levels on a first site to the highest energy level at the first site, such that subsequent decay of the excitation provides emission of photons and such that energy transferred between the first site and a second site induces a population of the excited state levels at the first and second sites.

31. The apparatus of claim 30 wherein said means for supporting includes trivalent rare earth ions.

32. The apparatus of claim 31 wherein said trivalent rare earth ions comprise trivalent praseodymium ions.

33. The apparatus of claim 30 wherein said means for supporting comprises a crystal lattice structure of rare earth trihalides.

34. The apparatus of claim 30 wherein said means for pumping comprises optically pumping said electrons.

35. The apparatus of claim 34 wherein said optical pumping comprises directing a laser at said electrons to pump the electrons from one of the excited energy levels to the highest excited energy level thereof.

36. An apparatus for population inversion comprising:

means for supporting at first and second sides a plurality of electrons on rare earth ions in a matrix configuration, each of said electrons at said first and second sites having a ground state, a first intermediate energy level, a second and higher intermediate energy level and a third energy level higher than said first and second intermediate levels, the energy spacing between said ground state and said first intermediate level being substantially equal to the energy spacing between said first and second intermediate energy levels and the electrons having energy transfer effected between electrons on said first and second sites; and means for pumping said electrons in said first intermediate level to said third energy level at the first site such that subsequent relaxation of electrons from said second intermediate level to said first intermediate level provides emission of photons and such that energy transfer between the first site and the second site induces a population of said intermediate levels at the first and second sites.

37. The apparatus of claim 36 wherein said rare earth ions comprise trivalent rare earth ions.

38. The apparatus of claim 36 wherein said ions comprise trivalent praseodymium ions.

39. The apparatus of claim 36 wherein said ions comprise trivalent samarium ions.

40. The apparatus of claim 36 whrein said means for supporting comprises a crystal lattice structure of rare earth trihalides.

41. The apparatus of claim 40 wherein said crystal structure comprises lanthium trichloride.

42. The apparatus of claim 35 wherein said means for pumping comprises an optical pump.

43. The apparatus of claim 42 wherein said optical pump is comprised of a laser directed at said matrix configuration at a selected wavelength.

44. An apparatus for lasing comprising:
   means for supporting a plurality of electrons on rare earth electrons in a matrix configuration, each of said ions having at least four energy levels, three of which are incrementally spaced with a substantially equal energy spacing;
   means for pumping the electrons from one of said intermediate energy levels of said four energy levels to the highest energy level thereof to attain population inversion in said intermediate levels such that decay of said electrons from one of said intermediate levels to the next lower of said intermediate energy levels provides emission of photons and induces population of said intermediate energy levels in a neighboring electron from said lowest energy level thereof; and
   means for sustaining an oscillatory mode within said matrix configuration such that coherent light is emitted at a fundamental wavelength.

45. The apparatus of claim 44 wherein said rare earth ions comprise trivalent rare earth ions.

46. The apparatus of claim 45 wherein said ions are praseodymium ions.

47. The apparatus of claim 45 wherein said ions are trivalent samarium ions.

48. The apparatus of claim 44 wherein said means for supporting comprises a crystal structure of rare earth trihalides.

49. The apparatus of claim 48 wherein said crystal structure comprises lanthium trichloride.

50. The apparatus of claim 44 wherein said means for pumping comprises an optical pump.

51. The apparatus of claim 50 wherein said optical pump comprises a laser directed at said matrix configuration.

52. The apparatus of claim 44 wherein said means for sustaining an oscillatory mode comprises:
   means for reflecting emitted photons from one end of said matrix configuration; and
   means for partially reflecting said photons from the diametrically opposite other end of said matrix configuration such that an optically resonant cavity is formed.

53. An apparatus for lasing comprising:
   means for supporting a plurality of electrons on rare earth electrons in a matrix configuration, each of said ions having a ground state, a first intermediate energy level, a second and higher intermediate energy level and a third excitation energy level higher than said first and second intermediate levels, the energy spacing between said ground state and said first intermediate level substantially equal to the energy spacing between said first and second intermediate energy levels;
   means for pumping the electrons in said first intermediate level to said third excitation level to provide a population inversion in said first and second intermediate levels such that relaxation of the electrons from said second intermediate level to said first intermediate level results in photon emission and further induces population of said intermediate levels in neighboring electrons from said ground state thereof;
   means for reflecting emitted photons from one end of said matrix configuration; and
   means for partially reflecting said photons from the diametrically opposite other end of said matrix configuration such that an optically resonant cavity is formed that emits coherent radiation at a fundamental wavelength.

54. The apparatus of claim 53 wherein said rare earth ions are trivalent

55. The apparatus of claim 54 wherein said ions are praseodymium ions.

56. The apparatus of claim 54 wherein said ions are samarium.

57. The apparatus of claim 53 wherein said means for supporting comprises a crystal lattice structure of rare earth trihalides.

58. The apparatus of claim 57 wherein said crystal lattice structure is comprised of lanthium trichloride.

59. The apparatus of claim 53 wherein said means for pumping comprises an optical pump.

60. The apparatus of claim 59 wherein said optical pump comprises a laser directed at said matrix configuration.

61. The apparatus of claim 53 wherein said means for reflecting comprises a silvered coating over said one end of said matrix configuration.

62. The apparatus of claim 53 wherein said means for partially reflecting comprises a partially silvered coating over said other end of said matrix configuration.

63. An apparatus for lasing comprising: means for supporting a plurality of electrons on trivalent ions in a crystal lattice structure of lanthium trichloride, each of said ions electrons having a ground state, a first intermediate excitation level, a second and higher intermediate excitation level and a third excitation level higher than said first and second excitation levels, the energy spacing between said ground state and said first excitation level substantially equal to the excitation spacing between said first and second excitation levels;
   a laser directed at said crystal lattice structure for pumping the electrons in said first excitation level to said third excitation level to provide a population inversion in said first and second excitation levels such that relaxation of the electrons from said second excitation level to said first excitation level results in photon emission and further induces population of said intermediate excitation levels of neighboring electrons from said ground state thereof;
   a silvered coating over one end of said crystal lattice structure to fully reflect emitted photons; and
   a partially silvered coating over the other end of said crystal lattice structure to partially reflect emitted photons wherein said crystal lattice structure provides an active laser medium and said reflecting surface and said partially reflecting surface form a resonant laser cavity that emits coherent radiation at a fundamental wavelength.

* * * * *